April 15, 1969 N. T. NEAPOLITAKIS 3,439,184

TAPE PLAYER CARTRIDGE EJECTOR CIRCUIT

Filed Nov. 14, 1967

Inventor
NICHOLAS T. NEAPOLITAKIS

BY Mueller, Aichele & Rauner

ATTYS.

3,439,184

TAPE PLAYER CARTRIDGE EJECTOR CIRCUIT

Nicholas T. Neapolitakis, Chicago, Ill., assignor to Motorola, Inc., Franklin Park, Ill., a corporation of Illinois Filed Nov. 14, 1967, Ser. No. 682,922
Int. Cl. H01h 7/00, 43/32, 47/32
U.S. Cl. 307—141 6 Claims

ABSTRACT OF THE DISCLOSURE

A tape cartridge ejector mechanism for a tape player has a circuit for energizing a solenoid coil including a capacitor. A first terminal of the capacitor is coupled to one terminal of the power supply through a first resistance and the second terminal of the capacitor is coupled to the same power supply terminal through a series of switches. The second terminal of the capacitor is also coupled to the other terminal of the power supply through a second resistance means. With the switches closed the voltage across the capacitor is substantially zero. Opening of any switch causes a momentary charging current to flow until the capacitor is fully charged. Transistors are coupled to portions of the first resistance and the charging current therethrough biases the transistors to conduction. The conducting transistors provide an energizing current to the solenoid coil.

*Background of the invention*

In a tape player employing a cartridge for storing the tape during the playing and non-playing periods, it is desirable that the tape cartridge be automatically ejected whenever the tape player is not in use. This relieves the pressure on the capstan drive mechanism reducing the tendency of the capstan to develop flat spots which reduce the quality of sound reproduction. In a number of tape players such automatic ejection means are necessary in order for the cartridge to be positioned so that it can be removed. This is particularly true in certain automobiles where the cartridge is mounted on or under the dashboard in such a manner that it is very difficult or impossible for the cartridge to be withdrawn manually.

Ejector mechanism used in tape players incorporate a solenoid to actuate the mechanism. Because of the small size of the solenoid coil and the necessity for developing relatively large amounts of mechanical force, such solenoids are subject to overheating if energized for too long a period of time. If the cartridge jams or wedges during ejection, or if the ejection switch is carelessly held closed by the operator, damage or destruction to the solenoid coil could result.

*Summary*

It is, therefore, an object of this invention to provide an improved circuit for energizing a tape cartridge ejector mechanism.

Another object of this invention is to provide an energizing circuit for a tape cartridge ejector mechanism which provides momentary energization of the solenoid coil.

Another object of this invention is to provide an energization circuit for a tape cartridge ejector mechanism which operates automatically to eject the cartridge when the tape player is turned off.

The invention is illustrated in the drawings of which:

*Description of the invention*

In practicing this invention a tape ejector mechanism is provided having a solenoid for actuating the mechanism. An output terminal of a power supply is coupled to one terminal of a capacitor through a first resistance and to the other terminal of the capacitor through one or more switches. The other output terminal of the power supply is coupled to the other terminal of the capacitor through a second resistance. Thus, with the switches closed, the potential across the capacitor is zero. If a switch is opened, a momentary charging current is provided which charges the capacitor to the potential of the power supply. One or more transistors coupled across portions of the first resistance are biased to conduction by the momentary flow of charging current. These transistors act to provide an energizing current for the solenoid coil. When the capacitor is fully charged, the bias current is removed and the solenoid coil is de-energized. Reclosing the switch causes a charging current to flow in the opposite direction thereby biasing the transistors to non-conduction.

Figure 1:
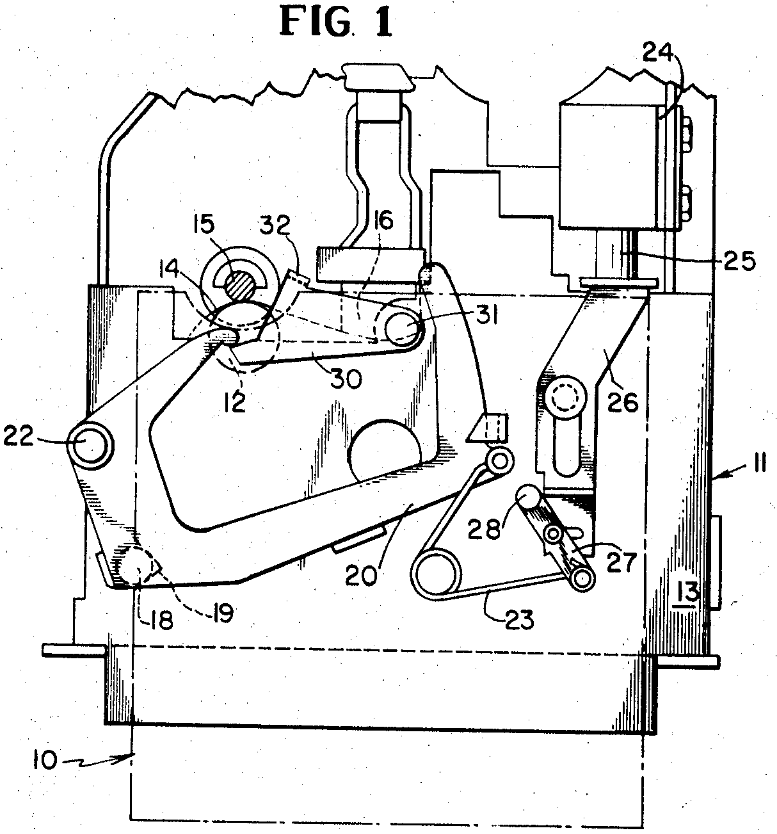
FIG. 1 is a drawing of a tape cartridge ejector mechanism.

The ejection mechanism is illustrated in FIG. 1. A tape cartridge 10 is shown by dot-dash lines inserted in a tape playing mechanism 11. The cartridge 10 when inserted into the playing mechanism is positioned below plate 13. The tape 14 within the cartridge is held by roller 12 against the capstan 15 of the playing mechanism. Capstan 15 is driven by a motor (not shown) to move the tape past recording head 16. The tape cartridge is locked in position by pin 18 inserted in groove 19 in the cartridge. Pin 18 extends from bell crank 20 which is pivoted on the plate 13 by pin 22 and biased into position by over center spring 23.

To eject the cartridge, solenoid 24 is energized causing the plunger 25 to move into the solenoid and to move slidable arm 26. The movement of arm 26 causes lever 27 to rotate about pivot 28. The rotation of lever 27 moves over center spring 23 so that it biases bell crank 20 in a clockwise direction to a new position. The rotation of bell crank 20 about pivot 22 causes pin 18 to be removed from groove 19 freeing the cartridge for ejection. Rotation of bell crank 20 also causes ejection lever 30 to be rotated about pivot 31. A projection 32 extending from ejection lever 30 is forced against cartridge 10 pushing the cartridge out of the tape player.

Figure 2:
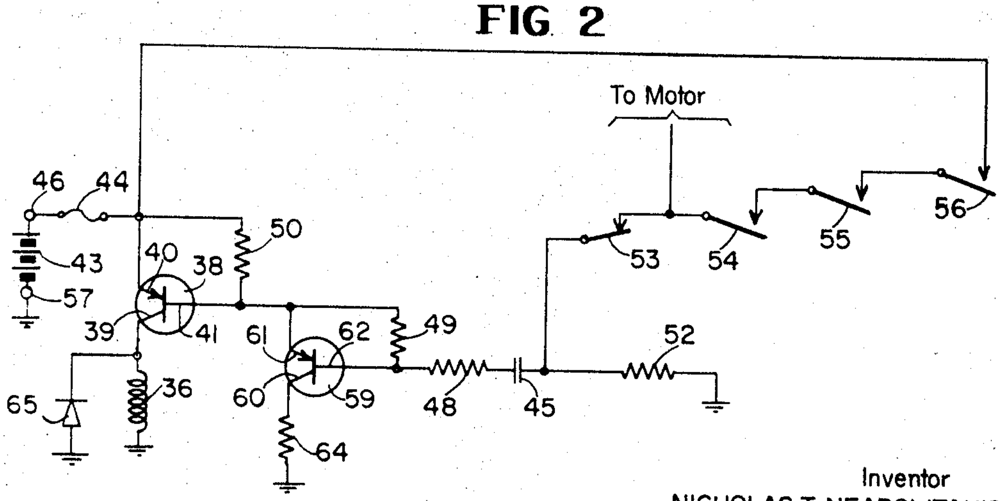
FIG. 2 is a schematic diagram of the circuit of this invention used to energize the ejector mechanism of FIG. 1.

In FIG. 2 there is shown a schematic of the energizing circuit for solenoid 24 of FIG. 1. The coil of solenoid 24 is shown as coil 36 in FIG. 2. Coil 36 is coupled to one terminal 46 of battery 43 through collector 39 and emitter 40 of transistor 38 and fuse 44. A capacitor 45 has one terminal connected to terminal 46 of power supply 43 through resistors 48, 49, 50 and fuse 44. The second terminal of the capacitor 45 is connected to terminal 46 through switches 53, 54, 55, 56 and fuse 44. The second terminal of capacitor 45 is also connected to terminal 57 of battery 43 through resistor 52.

The base-emitter junction of transistor 38 is connected across resistor 50 and the base-emitter junction of transistor 59 is connected across resistor 49. Collector 60 of transistor 59 is coupled to terminal 57 of power supply 43 through resistor 64. Diode 65 is coupled across solenoid coil 36 with reverse polarity to provide a shunt path for the energy stored in the solenoid coil when the coil is de-energized.

The circuit shown in FIG. 2 is one which is incorporated in an automobile. Switch 56 represents the ignition switch so that the tape player is not operative unless the ignition is turned on. Switch 55 is an on-off switch for the tape player. With the tape player turned on and with switches 55 and 56 closed, the tape player is ready for operation. Motor switch 54 is closed by inserting the cartridge into the tape player; thus the tape player is not operative unless a cartridge is inserted in the player. Switch 53 can be a separate ejection switch or it can be mechanically coupled to pushbutton radio switches for actuation thereby. As will be described subsequently the opening of any switch will energize solenoid coil 36.

With a cartridge inserted in the tape player and with switches 53, 54, 55 and 56 closed, both terminals of capacitor 45 will be connected to terminal 46 of battery 43 and the potential across capacitor 45 will be zero. If any of the switches 53–56 are opened, one terminal of capacitor 45 is connected to terminal 57 of battery 43 through resistor 52. With this connection a charging current flows into capacitor 45 until the potential across capacitor 45 is equal to the battery potential. The duration of this current depends upon the time constant of the circuit consisting of capacitor 45 and resistors 48, 49 and 50, 52.

During the time that the charging current is flowing through resistors 48, 49, 50 and 52, a bias voltage is developed across resistor 49 sufficient to bias transistor 59 to conduction. With transistor 59 biased to conduction current flows from emitter 61 to collector 60 through resistor 64. This additional current flows through resistor 50 producing sufficient voltage drop across resistor 50 to bias transistor 38 to conduction. With transistor 38 biased to conduction, solenoid coil 36 is energized operating the ejection mechanism. When capacitor 45 is charged the charging current ceases and transistors 59 and 38 are biased to non-conduction de-energizing solenoid coil 36. Thus solenoid coil 36 is energized only while capacitor 45 charges.

If the switches again are closed a discharge current flows through resistors 48, 49, 50 and 52 until the potential across capacitor 45 is reduced to zero. This discharge current flows in the opposite direction from the charging current and therefore biases transistors 38 and 59 further into non-conduction so that the ejection mechanism is not actuated.

Thus a simple circuit for actuating a tape player cartridge ejection mechanism has been disclosed. The circuit provides a momentary impulse to actuate the solenoid coil which operates the ejection mechanism. The opening of any one of a number of switches, such as the on-off switch or the ignition switch, acts to operate the ejection mechanism automatically.

I claim:

1. A tape cartridge ejector system, including in combination, ejection means positioned against the cartridge and including a solenoid coil, power supply means coupled to a reference potential and having an output terminal, capacitor means having first and second terminals, first resistance means coupling said first terminal to said reference potential, switch means coupling said power supply output terminal to said first terminal, second resistance means coupling said power supply output terminal to said second terminal, transistor amplifier means coupled across at least a part of said second resistance means, and circuit means coupling said transistor amplifier means to said solenoid coil, said capacitor means having a potential thereacross of zero with said switch means being closed, said power supply means providing a charging current through said first and second resistance means with said switch means being open, said charging current acting to increase the potential across said capacitor means from zero to a potential greater than zero, said transistor amplifier means being responsive to said charging current to become energized to provide a momentary operating current to said solenoid coil.

2. The tape cartridge ejector system of claim 1 wherein, said transistor amplifier means includes a first transistor having a base electrode coupled to said second terminal, an emitter electrode coupled to said power supply output terminal and a collector electrode coupled to said solenoid coil, said base and emitter electrodes of said first transistor further being coupled across a first resistance portion of said second resistance means, said charging current through said second resistance means acting to bias said first transistor to conduction whereby said solenoid coil is energized.

3. The tape cartridge ejector system of claim 2 wherein, said amplifier means further includes a second transistor having a base electrode coupled to said second terminal, an emitter electrode coupled to said base electrode of said first transistor and a collector electrode coupled to said reference potential, said second resistance means including a second resistance portion coupled in series with said first resistance portion, said base and emitter electrodes of said second transistor further being coupled across said second resistance portion, said charging current through said second resistance means acting to bias said second transistor to conduction whereby the current through said first resistance portion is increased to increase the conduction of said first transistor.

4. The tape cartridge ejector system of claim 3 wherein, said switch means includes a plurality of switches connected in series, the opening of any one of said plurality of switches acting to cause said charging current to flow through said second resistance means.

5. The tape cartridge ejector system of claim 4 wherein, said plurality of switches includes a normally open switch, said tape cartridge acting to close said normally open switch with said tape cartridge inserted within the tape player, whereby said tape cartridge ejector system is deenergized with said tape cartridge removed.

6. The tape cartridge ejector system of claim 3 wherein, a discharge current flows through said first resistance means with said switch means being closed, to change the potential across said capacitor means from said value greater than zero to zero, said first and second transistors being poled whereby said charging current acts to bias said first and second transistors to conduction, and said discharge current acts to bias said first and second transistors to nonconduction.

References Cited

UNITED STATES PATENTS

| | | | |
|---|---|---|---|
| 3,144,568 | 8/1964 | Silliman et al. | 317—142 X |
| 3,287,608 | 11/1966 | Pokrant | 317—148.5 X |
| 3,393,604 | 7/1968 | Lundin | 317—148.5 X |

ROBERT K. SCHAEFER, *Primary Examiner.*

T. B. JOIKE, *Assistant Examiner.*

U.S. Cl. X.R.

307—293; 317—148.5